No. 889,226. PATENTED JUNE 2, 1908.
W. HALL.
CORN HARVESTER.
APPLICATION FILED OCT. 7, 1907.

Witnesses
L. O. Little
M. L. Skinner

Inventor
Walton Hall
By Watson E. Coleman
Attorney

UNITED STATES PATENT OFFICE.

WALTON HALL, OF CAYWOOD, NEW YORK.

CORN-HARVESTER.

No. 889,226.     Specification of Letters Patent.     Patented June 2, 1908.

Application filed October 7, 1907. Serial No. 396,277.

*To all whom it may concern:*

Be it known that I, WALTON HALL, a citizen of the United States, residing at Caywood, in the county of Seneca and State of New York, have invented certain new and useful Improvements in Corn-Harvesters, of which the following is a specification, reference being had to the accompanying drawings.

My invention relates to improvements in corn harvesters and more particularly to a self adjusting throat for a machine of this character.

The object of the invention is to provide a simple and practical means for supporting the stretches of the conveyer chains in the throat of a corn harvester so that the corn will be elevated to the desired height to enable short stalks to be bound in the middle.

Figure 1:
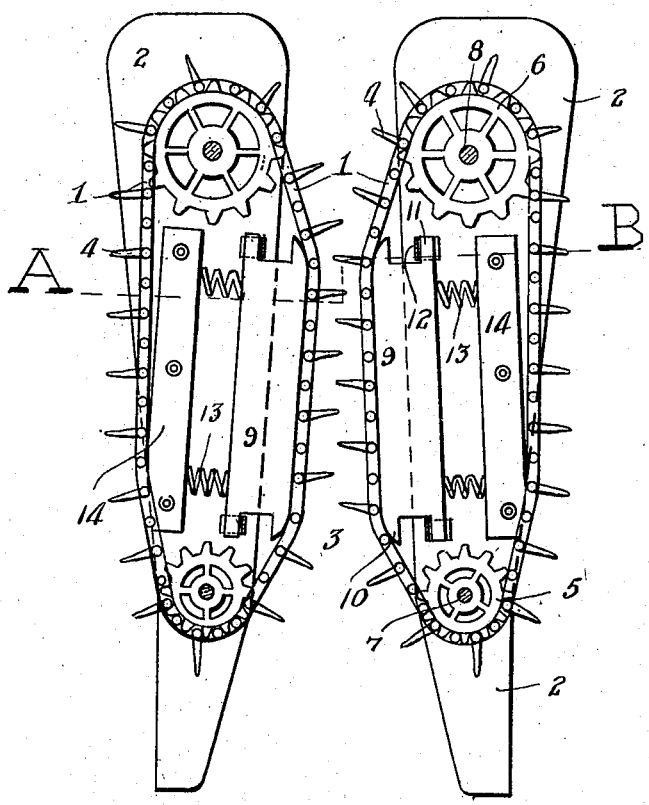
Figure 2:
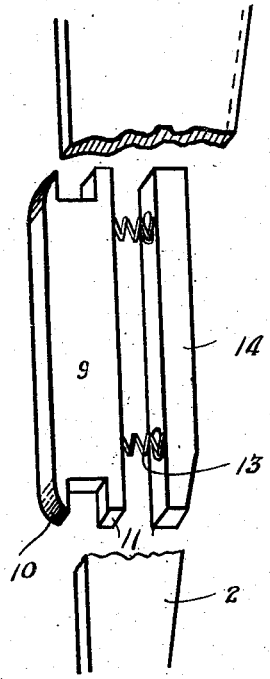
Figure 3:
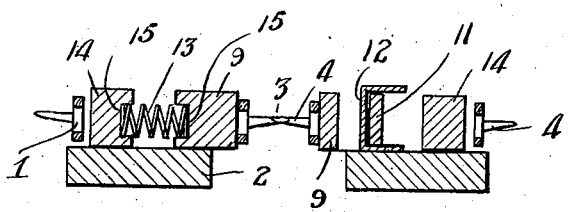

With the above and other objects in view the invention consists of the novel construction and the combination and arrangement of parts hereinafter described and claimed, and illustrated in the accompanying drawings, in which Figure 1 is a plan view of two of the co-acting conveyer chains of the corn harvester and their associated parts, showing the application of my invention thereto; Fig. 2 is a detail perspective of one of the spring actuated plates or members; and Fig. 3 is a detail transverse section taken on the plane indicated by the line A—B in Fig. 1.

In the drawings 1 denotes opposing conveyer chains in a corn harvester or the like and 2 denotes the usual chain boards which form between them the throat 3 for the passage of the corn stalks. The chains 1 are in the form of ordinary sprocket chains provided with fingers 4 and arranged to travel around front and rear sprockets 5, 6 fixed upon shafts 7, 8, journaled in suitable bearings in the boards 2 and in the frame of the machine.

9 denotes two spring actuated plates or members arranged for lateral sliding movement upon the boards 2 and adapted to engage and press the inner stretches or runs of the conveyer chains 1 inwardly toward each other so as to contract the throat 3 of the machine. The presser plates 9 are arranged so that their outer edges engage the chains and their outer corners are rounded as at 10 to prevent the chains from catching upon them. Said plates 9 may be mounted in any suitable manner upon the frame but I preferably recess their ends to provide projections 11 adapted to slide in combined guides and stops 12 in the form of U-shaped brackets secured upon the boards or frame 2 as clearly shown in Fig. 3. Said plates may be actuated by springs of any suitable form but I preferably employ coil springs 13 and arrange them between said plates and longitudinal cleats 14 bolted or otherwise secured upon the boards 2. The springs are preferably retained in position by the engagement of their ends with recesses or seats 15 formed in the opposing faces of the plates and cleats as shown in Fig. 3.

From the foregoing it will be seen that the spring pressed plates or members 9 force the opposing stretches of the chains toward each other so as to contract the throat 3 of the machine and that the corn stalks passing through the throat will be firmly engaged by the fingers 4 and said opposing stretches of the chains. When the plates 9 are forced outwardly to the limit of their outward movement the projections 11 engage the stop brackets 12 and the stretches of the chains will be close enough together to firmly engage very small stalks or small bunches of stalks, and that when large stalks and larger bunches of stalks pass through the throat of the machine the plates 9 will yield so that the chains will accommodate themselves to such stalks.

It will be understood that my invention may be applied to any of the several feed chains usually employed upon corn harvesters and that it may be mounted upon the bottom or top surfaces of the usual chain boards. I preferably, however, employ it in connection with the lowermost conveyer chains since its use in this connection enables the machine to effectively handle comparatively short corn and also increases the effectiveness of the feed mechanism of the harvester.

While I have shown and described the preferred embodiment of my invention it will be understood that I do not wish to be limited to the precise construction set forth, since various changes in the form proportion and minor details may be resorted to without departing from the spirit or sacrificing any of the advantages of my invention.

Having thus described my invention what I claim is:

The combination with the chain boards and the conveyer chains of a corn harvester, of substantially U-shaped guide and stop brackets arranged upon said boards, presser plates having at their ends recesses to receive said brackets, the outer edges of said plates being engaged with the opposing straps of said chains and having their outer corners rounded, cleats upon said boards, and coil springs arranged between said cleats and the inner edges of said plates, substantially as and for the purpose set forth.

In testimony whereof I hereunto affix my signature in the presence of two witnesses.

WALTON HALL.

Witnesses:
 CHARLES I. VAN LIEW,
 GEO. D. HALL.